May 29, 1962 C. A. CRAFTS 3,037,079

RECEIVER FOR PHASE SHIFT KEYED SIGNALS

Filed April 8, 1960 3 Sheets-Sheet 1

United States Patent Office 3,037,079

Patented May 29, 1962

3,037,079
RECEIVER FOR PHASE SHIFT KEYED SIGNALS

Cecil A. Crafts, Santa Ana, Calif., assignor to Robertshaw-Fulton Controls Company, Richmond, Va., a corporation of Delaware Filed Apr. 8, 1960, Ser. No. 20,851
8 Claims. (Cl. 178—88)

The invention presented herein relates to a receiver for a communication system and more particularly to circuitry for detection of phase shift keyed signals.

In a communication system using phase shift keyed signals, the information desired to be transmitted is impressed upon a carrier signal of a given frequency by effecting predetermined phase shifts in the carrier signal corresponding to the information to be transmitted. A phase shift keyed signal is thus a signal of a particular frequency that has portions that are of some arbitrarily designated zero phase and other portions that differ in phase from the zero phase portions.

No demodulation problem is presented when the carrier signal is available at the receiver along with the phase shift keyed signal. However, it is difficult to devise a practical system wherein the carrier signal is made available at the receiver due to the economics of band width, system complexity, and power which are ordinarily imposed on such practical systems. Effort has therefore been made to devise ways for producing a phase reference locally at the receiver that can be used to demodulate the received phase shift keyed signal. Previously, this has been done by providing a local oscillator at the receiver operating at the frequency of the carrier signal. Lack of stability of the oscillator in such systems has created problems. Another previous approach has been to use the received signal to obtain the phase reference needed. One method of accomplishing this is by means of a frequency multiplier which is driven by the received signal to provide a constant phase output of N times the signal frequency. This output is then divided by N to produce a reference wave of the same frequency as the signal. However, these and other systems for detecting a phase shift keyed signal without transmission of the carrier signal have limitations or disadvantages which affect the optimum operation desired of a receiver for phase shift keyed signals.

Among the limitations and disadvantages in known receivers for detecting phase shift keyed signals are sensitivity to voltage and gain changes due to the presence of linear stages, use of phase shift networks causing a system to be critical to variations due to changes in waveform, inability to self-correct an accidental reversal of sense of intelligence in the output, and limited speed of operation. Also, some known receivers are restricted to detection of transmission in which the duration of any given phase portion of the signal must be equal to that of all other phase portions, commonly known as synchronous transmission.

It is an object of the present invention, therefore, to provide a new and improved system to detect phase shift keyed signals which avoids one or more of the disadvantages and limitations of prior systems.

Another object of the present invention is to provide a receiver for detecting phase shift keyed signals which utilizes the transitions from one polarity to the other in the input signal for obtaining necessary information to reproduce the transmitted intelligence.

An additional object of the present invention is to provide a receiver for detection of phase shift keyed signals which corrects for accidental reversal of sense of the intelligence in the output signal.

A further object of the present invention is to provide a receiver for detection of phase shift keyed signals which does not require that the duration of each phase portion be the same.

Still another object of the present invention is to provide a receiver for detection of phase shift keyed signals which permits a certain degree of displacement of the signal along the time axis which may occur due to noise, interference or other factors present during transmission of the phase shift keyed signal over radio circuits.

Another object of the present invention is to provide a receiver for detection of phase shift keyed signals which can be operated at high speeds.

Another object of the present invention is to provide a receiver for detection of phase shift keyed signals which requires a minimum number of adjustments.

Such a receiver has been obtained by utilizing the information contained in the transitions from one polarity to the other in the input signal. The receiver first changes the received phase shift keyed signal into a square wave. This is necessary since it is, in most cases, not practical to transmit a square wave carrier. A phase shift keyed signal is therefore generally produced by introducing predetermined phase shifts in a sinusoidal carrier signal. The transitions from positive to negative polarity of the squarewave obtained from the phase shift keyed signal correspond to similar transitions in polarity in the phase shift keyed signal. The negative going transitions in each phase portion occur at intervals equal to the period of the carrier signal. The negative going transitions of like phase portions are, of course, offset from the positive going transitions of portions of a different phase by the amount of phase shift introduced in the carrier signal. A similar situation exists with regard to the positive going transitions in the signals.

By applying the positive or negative going transitions in the phase shift keyed signal to a plurality of gating or "and" circuits which are open for a portion of the carrier period as determined by the phase shift introduced into the carrier signal, and closed for the remaining portion of the carrier period and which are properly phased with respect to the carrier signal, it is possible to obtain an output from one of the gating circuits when a portion of the phase shift keyed signal of a given phase is received and an output from another gating circuit when a portion of the phase shift keyed signal of a different given phase is received. The outputs from the gating circuits are then applied to a circuit which has one output in response to output from one phase gating circuit and a different output in response to the output from another phase gating circuit, thus reproducing the keying signal.

It is necessary, however, that the proper time relationship or phase between the input and the gating voltages applied to the gating circuits be maintained. Since the output of each gating circuit is dependent on information obtained from the received phase shift keyed signal, the output of the gating circuits can be used to drive a signal generator to produce a constant phase signal equivalent to the unmodulated carrier signal. The signal thus produced is applied to a gating generator which provides the gating voltages of proper phase for the gating circuits.

For a better understanding of the present invention, together with other and further objects thereof, reference is had to the following description taken in connection with the accompanying drawings wherein.

Figure 1:
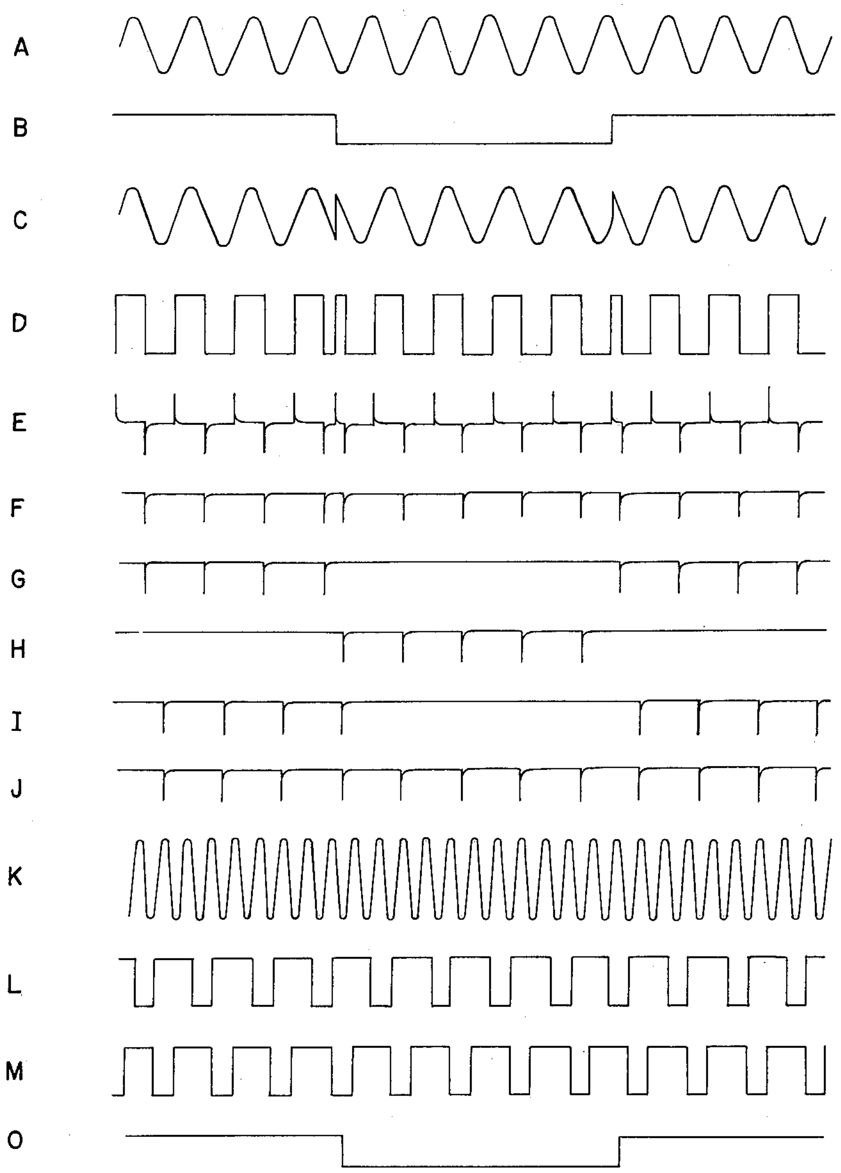
FIG. 1 shows the various waveforms as they appear at different parts of the receiver.
Figure 2:
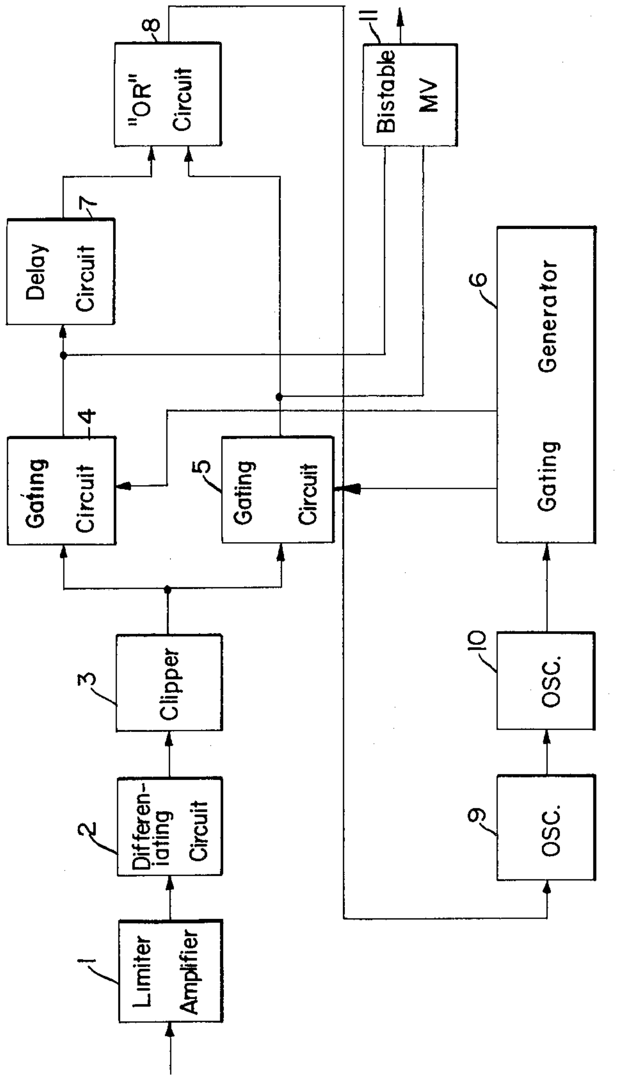
FIG. 2 is a block diagram of a receiver for demodulating the phase shift keyed signal in accordance with the present invention.
Figure 3:
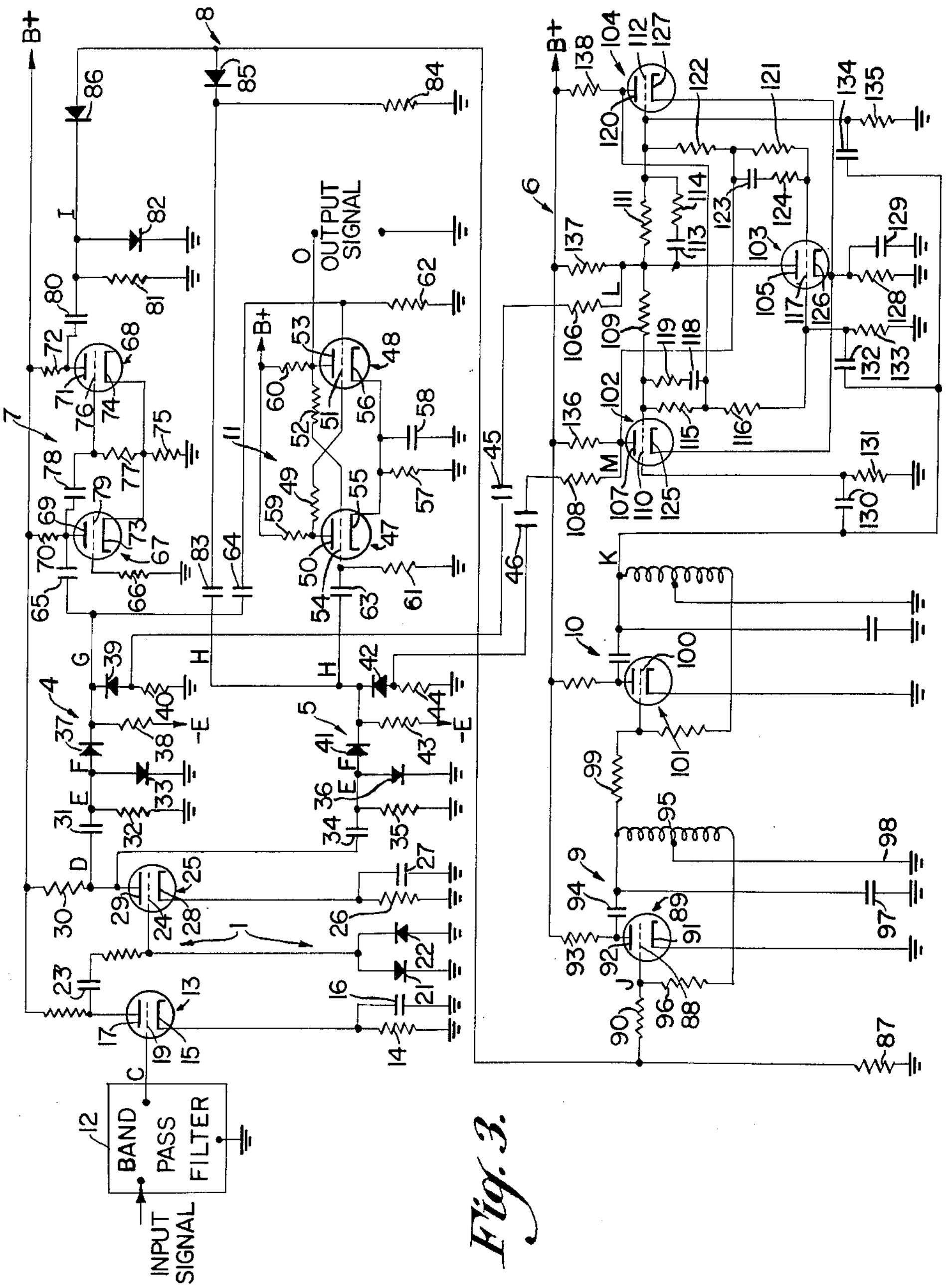
FIG. 3 is a schematic circuit diagram of a receiver for demodulating a phase shift keyed signal in accordance with the present invention.

Referring now to FIG. 1 of the drawings, there is represented the various waveforms used to explain the embodiment of the invention illustrated in FIGS. 2 and 3. A sine wave is shown at A of FIG. 1 of the accompanying drawings which represents the carrier signal prior to being phase shift keyed in accordance with the intelligence desired to be transmitted. The waveform represented at B of FIG. 1 shows a typical information signal used to key the carrier signal. For purposes of illustration, a 120° phase shift system is used. With phase shift increments of 120°, it is possible for a carrier wave to be keyed so that it would consist of portions of 0°, 120°, and 240° or —120°. In the 120° phase shift system shown, the keyed carrier indicated at C consists only of portions that are of 0° phase and portions that are shifted 240° or —120°. There are no portions that have a phase of 120°. Thus the 0° phase portions are transmitted in response to portions like the first or "on" portion of the keying waveform and the —120° phase portions in response to the portions like the central or "off" portion of the keying waveform. The phase shift keyed signal that is transmitted has a first portion that is of 0° phase, followed by a —120° phase portion, then a 0° phase portion and so on. The apparatus used to accomplish the phase shift keying of the carrier wave does not form a part of this invention and is therefore not discussed.

Though the receiver to be described to illustrate the invention is for receiving a phase shift keyed signal having only portions of 0° and —120° phase, it should be appreciated that receivers made in accordance with the invention can be used to receive any phase shift keyed signal in which the phase of any portion as measured from some arbitrary phase reference is a whole multiple of an increment of phase $\phi$, where $\phi$ is the largest increment of phase that can be divided into any phase shift that is possible in the phase shift keyed system a whole number of times. Thus, where $\phi$ is equal to 120°, it is possible to have a phase shift keyed signal that consists of portions that are 0°, 120°, or 240° in phase. When $\phi$ is 144°, the phase shift keyed signal can consist of portions that are 0°, 144° and 288° in phase. Similarly, if $\phi$ is 90°, the phase shift keyed signal can consist of portions that are 0°, 90°, 180°, or 270° in phase. The information to be transmitted determines the time a particular phase shift is to be introduced into the carrier signal, the duration of the various portions and the number of possible phase shifts needed.

Referring more particularly to FIG. 2 of the drawings, there is represented in the block diagram form a receiver for receiving a phase shift keyed signal consisting of 0° and 240° or —120° phase portions, as shown in FIG. 1C. The transmitted phase shift keyed signal is received and applied to the input of the limiter-amplifier 1 to produce the square waveform shown at D which is applied to a differentiating circuit 2 to produce the waveform shown at E consisting of positive going spikes or pulses due to the positive going transitions of the squarewave and negative going spikes or pulses due to the negative going transitions in the square waveform. Considering the negative going pulses, it can be seen that they are equally spaced along the time axis except that those occurring during the —120° phase portion of the phase shift keyed signal are offset ⅓ of the carrier period from those of the 0° phase portion. The same holds true for the positive going spikes or pulses.

The negative going pulses or the positive going pulses are applied to coincidence or "and" gating circuits 4 and 5, one for each different phase portion transmitted. Each gating circuit has a gating voltage applied to it from a gating generator 6, so that an output is obtained from one of the gating circuits corresponding in time to the 0° phase portions of the phase shift keyed signal and an output is obtained from another gating circuit corresponding in time to the —120° phase portions of the phase shift keyed signal. The output of gate 4 is shown at G in FIG. 1, while the output of gate 5 is shown at H in FIG. 1.

In the block diagram, a clipping circuit 3 is used to eliminate the positive going pulses of the waveform shown at D so that a waveform having only negative going pulses, as shown at F, is applied to the "and" gates 4 and 5. However, it is also possible to use the positive going pulses rather than the negative going pulses since they contain information similar to that provided by the negative going pulses.

The fact that an output is obtained from gates 4 and 5 indicates that the gating voltage applied from the gating generator 6 has been applied at the proper time and use is therefore made of the output from gates 4 and 5 to synchronize the operation of gating generator 6 so that the proper phase or time relation between the input signals to the gating circuits and the gating voltage signals can be maintained. This is accomplished by combining the outputs of the gating circuits in such a manner that an uninterrupted train of equally spaced pulses is produced for synchronizing the operation of a reference generator. The pulses are combined so that the time between adjacent pulses is equal to the period of the carrier signal. In the receiver shown in FIG. 2, this is accomplished by applying the output of gate 4, which produces an output signal consisting of pulses corresponding to positive to negative transitions in the 0° phase portion of the phase shift keyed signal, to delay circuit 7 which delays each pulse one third of the period of the carrier. The output of the delay circuit 7 is shown at I in FIG. 1.

The outputs of gate 5 and the delay circuit 7 are applied to an "or" circuit 8 which passes both outputs and in effect adds them to provide the signal shown at J in FIG. 1. This signal consists of an uninterrupted train of equally spaced pulses which contains no information regarding the phase transitions in the phase shift keyed signal with the time between pulses equal to the period of the carrier signal. The output of the "or" circuit 8 is applied to a reference signal generator in the form of a driven oscillator 9 tuned to the carrier frequency. Since the pulses in the output signal of the "or" circuit 8 have a repetition rate equal to the period of the carrier signal, the oscillator 9 will be driven in a 1:1 basis to provide excellent locking. The output of the oscillator 9 is of the same frequency as the carrier signal shown at A in FIG. 1 and is used to drive an oscillator 10 which in this case is tuned to three times the frequency of the oscillator 9.

The output of oscillator 10 is shown at K in FIG. 1 and is used to drive the gating generator 6, which may be a conventional ring counter type circuit. The gating generator 6 provides an output signal as shown at L in FIG. 1 which is a series of equally spaced unidirectional pulses having a frequency equal to that of oscillator 9 and a second output shown at M which is a series of similarly spaced pulses which are displaced —120° from the other output. The pulses are ⅓ of the period of oscillator 10 in duration and in each case are centered on the positive to negative transitions of the phase shift keyed signal and therefore provide a maximum amount of latitude in pulse position displacement along the time axis which might be introduced by noise, interference, or other factors during transmission.

The rate of frequency drift of the driven oscillator 9 is controlled such that resynchronization takes place within a predetermined length of time should there be no synchronizing pulses applied.

In the case where $\phi$ is 72°, for instance, with, say, 0°, 72°, 144°, and 216° transmitted, and 288° reserved for forbidden phase, three delay circuits (for the 72°, 144° and 216° positions), will be required, with delays of ⅕, ⅖, and ⅗ of the carrier period respectively. The "or"

circuit will then have four inputs, and the second oscillator will be tuned to 5 times carrier frequency. Four gating waveforms will be generated and applied to four "and" circuits.

Synchronization of the system can be lost due to interference or interruption of the carrier. Should the synchronization of the system be lost and the gating waveforms arrive with the wrong time (phase) relationship to the input pulses, one or the other of the gates will produce no output regardless of the phase of the carrier, while its opposite number will pass the "wrong" pulses, that is, those which the first mentioned gate should normally pass; therefore, the synchronizing pulses to the oscillator 9 will cease either immediately or as soon as the next change in the carrier phase takes place. With no synchronizing pulses to drive it, the oscillator 9 will drift in frequency, which is the equivalent of drifting in phase, since a driven oscillator must, in order to "lock on," be tuned to a frequency slightly below the synchronizing or driving frequency. The drift will continue until resynchronization is established, and since the drift rate is a function of the tuning of oscillator 9, it can be set up, within limits, to yield any desired resynchronization time, with relatively fast or quite slow response possible, depending on the requirements of the particular application.

It should be noted that this automatic synchronization feature, which applies to initial operation as well as subsequent loss of synchronization for any reason, is possible only if one of the possible phases is reserved as a "forbidden channel" and is therefore never employed in the transmission. Thus a "two phase" system, where $\phi=180°$, cannot have this feature, and if synchronization "slips" by ½ the period of the carrier, the sense of the transmitted intelligence is reversed, a shortcoming common to several of the conventional phase shift demodulating systems. The automatic resynchronization feature is possible as long as one "forbidden channel" is reserved. Thus, with a system transmitting four of five possible phases, resynchronization takes place in a similar manner, although several steps may be required as the system arrives at one after another "wrong" phase and subsequently rejects it until the correct one is found and retained.

To reconstruct the keying signal shown at B in FIG. 1, the outputs of gate 4 and gate 5 are used to trigger a bistable multivibrator 11 to provide the output shown at O, which is substantially the same as the keying waveform shown at B.

It is apparent that as a variation it is possible to eliminate delay circuit 7 and oscillator 10 and apply the outputs of gates 4 and 5 to oscillator 9 which is then tuned to three times the carrier frequency and apply its constant phase output to the gating generator 6.

In addition, it is also apparent that delay circuit 7 could be omitted and the output of gate 5 applied to a delay circuit to delay the output of gate 5 240° which, when combined with the output of gating circuit 4, will produce the necessary synchronizing pulses as shown at J.

The receiver shown in the block diagram of FIG. 2 is for a 120° phase shift keyed system in which $\phi=120°$ and only two of the three possible phases were transmitted. The particular phase shift keyed system will determine the frequency of oscillator 10 following the driven oscillator 9 and the design of the gating generator. Thus, for example, if $\phi$ is 72°, the frequency of oscillator 10 would be 5 times the carrier frequency. Where the carrier period is equal to $N\phi$, where N is an integer, the input to the gating generator can be obtained from an oscillator which is tuned to N times the frequency of the carrier signal. In cases where $\phi$ is not a whole multiple of the period of the carrier signal it is necessary to use a frequency divider after oscillator 10. Thus, where the possible phase portions are 0°, 144° and 288°, $\phi$ is 144°. This requires that the input to the gating generator 6 be a signal having a frequency which is 2.5 times the frequency of the carrier signal. This can be provided by tuning oscillator 10 to five times the frequency of the carrier signal and using its output signal to drive an oscillator tuned to one-half the frequency of oscillator 10.

The number of gating circuits, of course, will depend on the different phase portions that are actually transmitted. Thus, if four of the five possible different phase shifts were used, four gating circuits would be required which, of course, would require that four gating voltages be provided by a gating generator.

FIG. 3 is a schematic circuit diagram of the system shown in block form in FIG. 2. The received phase shift keyed signal is normally passed through a band pass filter 12, amplified, limited, and then amplified to form the squarewave shown at D in FIG. 1. The output of the band pass filter 12 is amplified by an amplifier stage including space discharge device 13. The device is cathode biased by a resistor 14 connected between the cathode 15 and ground. A bypass capacitor 16 is connected in parallel with resistor 14. The plate 17 is connected via a load resistor 18 to the B+ or plate voltage supply. The output of the band pass filter 12, which is the phase keyed signal shown at C in FIG. 1, is applied between the control element 19 of the space discharge device 13 and ground.

The limiting circuit, referred to by reference numeral 1 in FIG. 2, may be of the parallel diode type and includes the resistor 20 connected in series with the parallel connected but oppositely poled diodes 21 and 22. The diodes 21 and 22 are connected to ground and the resistor 20 is connected to plate 17 via coupling capacitor 23. The voltage signal appearing across the diodes 21 and 22 is a squarewave and is applied to the control element 24 of the space discharge device 25 which is connected as an amplifier. The device 25 is cathode biased using resistor 26 connected in parallel with bypass capacitor 27 between the cathode 28 and ground. The plate 29 is connected to the B+ or plate voltage supply via a load resistor 30.

The voltage signal appearing between the plate 29 and ground is the square wave shown at D in FIG. 1 and is applied to an R-C differentiating circuit including a capacitor 31 and a series connected resistor 32. Capacitor 31 is connected to the plate 29 and resistor 32 is connected to ground. The voltage signal appearing across resistor 32 is the waveform shown at E in FIG. 1. The positive going pulses of this signal correspond to the negative to positive transitions in the squarewave applied across the capacitor 31 and the resistor 32 while the negative going pulses correspond to the positive to negative transitions of the signal voltage applied across the capacitor 31 and the resistor 32.

A diode 33 is connected in parallel with resistor 32 to form a parallel diode clipper. The diode is poled so that it presents a high resistance to a negative voltage signal appearing across the resistor 32 and a low resistance to a positive voltage signal applied to it. The positive going pulses appearing across resistor 32 are therefore effectively shorted out by the diode 33.

A second differentiating circuit and parallel diode clipper like those just described are similarly connected to the plate 29 of space discharge device 25. Capacitor 34 and resistor 35 form the differentiating circuit and diode 36 forms the parallel diode clipper. The voltage waveform appearing across diode 33 and diode 36 is shown at F in FIG. 1 and is like the waveform shown at E except that the positive going pulses are removed.

The gating or "and" circuit, referred to by reference numeral 4 in FIG. 2, is connected across diode 33, while gating circuit 5 is connected across diode 36. The gating circuit 4 includes a diode 37 having its anode connected to the anode diode 33 and its cathode to one end of a resistor 38 and the cathode of a diode 39. The other end of resistor 38 is connected to a source of negative bias voltage, designated as −E, while the anode of diode 39 is connected to ground via a resistor 40. Diode 37 is poled to present a low resistance path to current flowing from diode 33 to diode 39. Diode 39 is poled to present a low resistance path to current flowing from resistor 40 to diode 37. The gating circuit 5 connected across diode 36 is like gating circuit 4 and includes diodes 41 and 42 and resistors 43 and 44 which correspond to diodes 37 and 39 and resistors 38 and 40, respectively, of gating circuit 4.

In order than an output signal appear between ground and the junction of diode 37 and diode 39, it is necessary that a positive voltage be applied at the connection common to diode 39 and resistor 40. This gating voltage is applied at the connection common to diode 39 and resistor 40 via capacitor 45. The gating circuit 5 operates in a similar manner, with capacitor 46 coupling the gating voltage to the connection common to resistor 44 and diode 42.

It is necessary that one gating circuit have an output in response to the negative going pulses corresponding to the positive to negative transitions in the 0° phase portions of the phase shift keyed signal and that another gating circuit have an output in response to the negative going pulses corresponding to the positive to negative transitions in the −120° phase portions of the phase shift keyed signal. In the circuit shown in FIG. 3, gating circuit 4 receives the necessary gating voltage to provide a negative going pulse for each positive to negative transition in the 0° phase portions of the phase shift keyed signal via capacitor 45. The output of gating circuit 4 is shown at G in FIG. 1. Gating circuit 5 receives the necessary gating voltage to provide the signal H which has a negative going pulse for each positive to negative transition in the −120° phase portions of the phase shift keyed signal via capacitor 46. The circuitry for obtaining the necessary gating voltages will be explained after first considering the circuitry utilizing the output of the gating circuits 4 and 5 to reproduce the keying waveform as shown at B in FIG. 1.

Since the transitions in the phase shift keyed signal are represented by pulses, it is possible to use a bistable multivibrator, or what is often referred to as a flip-flop circuit, to reproduce the keying waveform. This, of course, is desirable since it allows the receiver to operate at a faster rate than was possible with prior known systems.

In slower speed systems, it is possible to employ a variation wherein the bistable multivibrator 11 is replaced by two one-shot multivibrator circuits. These can take the form of the one-shot multivibrator which comprises a part of the delay circuit 7, shown in FIG. 3. The outputs of the two one-shot multivibrators are then rectified and filtered in such a manner that a positive D.C. voltage is obtained from the 0° channel and a negative D.C. voltage is similarly obtained from the −120° channel. The addition of these voltages will result in a reconstitution of the original keying waveform B of FIG. 1.

A bistable multivibrator is represented generally at 11 and is a conventional bistable multivibrator having two space discharge devices 47 and 48, each having a plate, a control element, and a cathode. Direct resistance coupling is used between the plates and grids or control elements of the two space discharge devices. Thus, a resistor 49 connects plate 50 of device 47 with the control element 51 of device 48, while a resistor 52 connects plate 53 of device 48 with the control element 54 of device 47. The cathode 55 of device 47 is connected to cathode 56 of device 48 and connected to ground via a resistor 57 which provides cathode biasing. A bypass capacitor 58 is connected in parallel with resistor 57. The plate 50 of device 47 is connected to the plate voltage supply B+ via the load resistor 59, while plate 53 of device 48 is so connected via load resistor 60. The control element of device 47 is connected to ground via resistor 61 and control element 51 of device 48 is connected to ground via resistor 62. The desired output signal is obtained between plate 53 of device 48 and ground. The control element 54 of device 47 is coupled to gating circuit 5 via capacitor 63, while control element 51 of device 48 is coupled to the gating circuit 4 via capacitor 64.

As previously explained, the output from gating circuit 4 will not occur at the same time as the output from gating circuit 5. Thus, assuming the negative pulses of the signal output G of gating circuit 4 are applied to the control element 51 of device 48, device 48 is made nonconductive upon application of the first pulse. Device 47 conducts when device 48 is not conducting and maintains device 47 in a state of nonconduction. Thus, the successive negative going pulses applied to device 48 from gating circuit 4 do not alter the operation of the circuit initiated by the first negative going pulse applied to the control element 51 of device 48. The plate voltage of device 48 is equal to the B+ supply voltage when it is not conducting since there is no voltage drop due to current flow through resistor 60. Upon application of a negative going pulse of the signal output H of gating circuit 5 to the control element 54, device 47 is made nonconductive and device 48 in turn is made conductive due to the increase in the plate voltage of device 47 which occurs when it is made nonconductive. Device 48 remains conductive until a negative triggering pulse is applied to its control element 51 from gating circuit 4. The output signal of the multivibrator 11, which is a measure of the plate voltage of device 48, has one level when device 47 is made conductive in response to device 47 being made nonconductive by a triggering signal from gating circuit 5 and a lower level of operation when device 47 is made nonconductive in response to a negative triggering signal applied to control element 51 from gating circuit 4. This output signal is shown at O in FIG. 1 and is substantially the same form as the keying signal shown at A.

In addition to supplying the necessary triggering pulses for bistable multivibrator 11, the output from gating circuit 4 and gating circuit 5 is used to control the gating generator 6.

The output voltage of gating circuit 4 is applied to the delay circuit, indicated generally at 7, via coupling capacitor 65. The delay circuit 7 includes a conventional one-shot cathode coupled multivibrator, the output of which is applied to a differentiating circuit and a clipping circuit. The multivibrator includes two space discharge devices 67 and 68, each having a plate, a control element, and a cathode. The plate 69 of device 67 is connected via a load resistor 70 to the plate voltage supply B+. The plate 71 of device 68 is similarly connected via a load resistor 72. The cathodes 73 and 74 are connected together and are connected to ground via a resistor 75. The cathodes 73 and 74 are also connected to the control element 76 of device 68 via resistor 77. The plate 69 of device 67 is coupled to the control element 76 of device 68 via a capacitor 78. The grid or control element 79 of device 67 is connected to ground via resistor 66. The capacitor 65 is used to couple the output of the gating circuit 4 to the delay circuit 7 and has one side connected to the junction of diode 37 and diode 39 and the other side connected to the plate 69 of device 67.

Device 68 will normally be conducting since its control element 76 is connected to its cathode 74 and no current is flowing in resistor 77 with device 67 not conducting. Device 67 is not conducting since its control element 79 is connected directly to ground by resistor 66 and its cathode is above ground potential due to current flowing in resistor 75. The voltage developed across resistor 75 is sufficient to hold device 67 beyond cutoff.

The output of gating circuit 4 is shown at G in FIG. 1. This output has negative going pulses which are applied to the plate 69 of device 67 via capacitor 65. Each pulse causes device 67 to conduct. Conduction of device 67 causes its plate voltage to decrease. This decrease in plate voltage is applied to the control element 76 of device 68 causing it to conduct less, which decreases the voltage developed across resistor 75, causing a further decrease in the current flow through device 68. The action is cumulative until the device 68 is driven beyond cutoff by the drop in the plate voltage of device 67. As the device 68 is cut off, its plate voltage increases. Capacitor 78 then discharges the control element voltage of device 68 causing it to conduct once again with a resulting decrease in its plate voltage. The time interval between the decrease and the following increase in the plate voltage of device 67 is, of course, dependent on the time constant of the discharge circuit for capacitor 78 which is adjusted so that this interval is equal to 120 electrical degrees or ⅓ of the interval between pulses in the signal G applied to device 67. Thus, the plate voltage of device 68 increases when it is made nonconductive as a result of a negative pulse from gate 4 applied to the plate 69 of device 67 and then decreases when it becomes conductive again.

The voltage appearing between the plate 71 of device 68 and ground is applied to a differentiating circuit consisting of capacitor 80 connected in series with a resistor 81. Thus a voltage signal is developed across resistor 81 consisting of a series of positive and negative going pulses, the negative going pulses corresponding to the decrease in plate voltage and the positive going pulses corresponding to the increase of plate voltage of device 68. The capacitor 80 is connected to the plate 71 of device 68, while the resistor 81 is connected to ground.

A diode 82 is connected in parallel with resistor 81 to form a parallel diode clipper and is poled to present a low resistance path to positive going pulses and a high resistance path to negative going pulses. The voltage signal appearing across diode 82 is thus a series of negative going pulses, one for each of the negative pulses appearing in the output of gating circuit 4 but delayed 120 electrical degrees, as shown at I in FIG. 1.

The waveform shown at J in FIG. 1 is obtained by combining the waveform H and waveform I and, as can be seen, consists of a continuous series of negative going pulses spaced apart by the period of the carrier signal. In addition, it should be noted that the pulses correspond to the points of positive to negative transition in the carrier signal A. An oscillator synchronized by these pulses can then provide an output which is identical to the carrier waveform A.

The waveform H is the output of gating circuit 5 and is coupled to the "or" circuit 8, indicated in the block diagram of FIG. 1 by a capacitor 83 and resistor 84. One side of capacitor 83 is connected to gating circuit 5 at the junction of diodes 41 and 42. The other side of capacitor 83 is connected to one end of resistor 84 which has its other end connected to ground. The voltage appearing across resistor 84 is applied to the "or" circuit which includes two diodes 85, 86 and a resistor 87. Specifically, diode 85 has its cathode connected to the junction of capacitor 83 and resistor 84 and its anode connected to one end of resistor 87 which has its other end connected to ground. The diode 85 is thus poled to present a low impedance to the negative going pulses appearing across resistor 84.

The waveform I is the output of delay circuit 7 and appears across diode 82 and is applied across the diode 86 and resistor 87 of the "or" circuit. The diode 86 has one side connected to the connection common to diode 85 and resistor 87. The other side of diode 86 is connected to delay circuit 7 at the connection common to diode 82 and resistor 81. Diode 86 is poled like 85. Diodes 85 and 86 serve to prevent pulses from one source from entering the circuitry of the other source and vice versa, so that no undesirable interaction will take place.

The waveform appearing across resistor 87 is shown at J in FIG. 1 and is the sum of the waveform H and the waveform I and is applied to the control element 88 of the space discharge device 89 of oscillator 9 which is tuned to carrier frequency. The pulses of waveform J are unidirectional and are spaced apart in time equal to the period of the carrier waveform A thus providing synchronization of oscillator 9 on a one-to-one basis to provide excellent locking.

A resistor 90 connects the control element 88 of device 89 to the side of resistor 87 away from ground. The cathode 91 of device 89 is connected directly to ground. The plate 92 is connected to the plate voltage supply B+ via a load resistor 93. A capacitor 94 is connected between plate 92 and an inductance coil 95 which in turn is connected in series with a resistor 96. The end of resistor 96 away from inductance coil 95 is connected to control element 88. A capacitor 97 is connected between ground and the connection common to capacitor 94 and inductance coil 95. The inductance coil 95 has a point intermediate its ends connected to ground via a conductor 98.

The output of oscillator 9 is used to drive oscillator 10 which has the same type of elements connected in the same manner as oscillator 9 but is tuned to N times the frequency of oscillator 9. N, in this case, is 3. Oscillator 9 is coupled to oscillator 10 via a resistor 99 connected between the control element 100 of a space discharge device 101 of oscillator 10 and the connection common to inductance coil 95 and capacitor 94.

The output of oscillator 10, which is shown at K in FIG. 1, is applied to the gating generator 6, which in this case is a conventional ring counter type circuit providing a plurality of outputs. Each output consists of a series of negative pulses having a duration equal to the period of the output of the signal applied to the ring counter, with a pulse of one series beginning with the termination of the pulse of another series. Thus, for the 120° phase keying system, the pulses are equal in width to the period of oscillator 10 which is ⅓ the period of the output of oscillator 9. The various outputs are taken from the plates of the space discharge devices used in the ring counter. For the 120° phase keying system, the ring counter includes three space discharge devices 102, 103, 104, only one of which conducts at any one time. The space discharge devices are made conductive in sequence with a different one conducting each time the output signal K of oscillator 10 reaches a minimum value. Thus, space discharge device 102 conducts after space discharge device 103, followed by space discharge device 104. A negative pulse equal in width to the period of conduction is thus available at the plate of the conducting space discharge device. The plate 105 of device 103 is connected to gating circuit 4 via dropping resistor 106 and capacitor 45, while device 102, which conducts after device 103, has its plate 107 connected to gating circuit 5 via dropping resistor 108 and capacitor 46. The plate voltage of each space discharge device, of course, drops when it is made conductive and then increases to the plate voltage supply B+ when it is not conducting. Thus, the gating voltage for gating circuit 4 obtained at the plate of device 103 takes the form shown at L in FIG. 1, while the gating voltage for gating circuit 5 obtained at the plate of device 102 takes the form shown at M. Since device 102 conducts after device 103, each negative pulse of waveform M begins at the termination of a negative pulse of waveform L.

When a negative pulse of waveform L is applied to the gating circuit 4, the gating circuit 4 will have an output when a pulse representing a positive to negative transition in the phase shift keying signal is applied to the gating circuit. A close examination of the waveform G representing the input to gating circuit 4 and the waveform L will show that the pulses of waveform G are centered on the negative pulses of waveform L. Thus, an output will be obtained from gate 4 even though a pulse of waveform G is displaced plus or minus 60° from the position shown in waveform G. The same relationship exists between the negative pulses of waveform M and the pulses of waveform H which represent the input signal to gate 5. Such displacement can occur due to noise and other interference encountered during transmission of the phase shift keyed signal.

The control elements of each of the space discharge devices 102, 103, 104 are interconnected. A resistor 109, connected to control element 110 of device 102 and in series with a resistor 111 which is connected to control element 112 of device 104, provides the interconnection between control elements 110 and 112. A capacitor 113 in series with a resistor 114 is connected in parallel with resistor 111. The plate 105 of the other device 103 is connected to the connection common to resistor 109 and resistor 111. Similarly, a resistor 115 is connected to control element 110 of device 102 and in series with a resistor 116 connected to control element 117 of device 103 to provide the interconnection between the control elements of devices 102 and 103. A capacitor 118, in series with a resistor 119, is connected in parallel with resistor 115. The plate 120 of device 104 is connected to the connection common to resistor 115 and resistor 116. A resistor 121, connected in series with a resistor 122, provides the interconnection between control element 117 of device 103 and control element 112 of device 104. Resistor 121 is connected to control element 117 while resistor 122 is connected to control element 112. A capacitor 123, in series with a resistor 124, is connected in parallel with resistor 122. The plate 120 of device 104 is connected to the connection common to resistor 115 and resistor 116. The plate 107 of device 102 is connected to the connection common to the resistors 121 and 122.

The cathodes 125, 126, 127 of devices 102, 103, 104, respectively, are connected directly together and thence to ground via a resistor 128. A bypass capacitor 129 is connected in parallel with resistor 128.

Each of the control elements of the devices 102, 103, 104 are resistance-capacitance coupled to the output of oscillator 10. Thus, control element 110 of device 102 is connected to the end of the inductance coil of oscillator 10 adjacent the plate of device 101 of oscillator 10 via a capacitor 130. The control element 110 is further connected to a resistor 131 which is connected to ground. A capacitor 132 and resistor 133 and a capacitor 134 and resistor 135 provide similar resistance-capacitance coupling between oscillator 10 and devices 103 and 104, respectively.

The plates of devices 102, 103, 104 are connected to the plate voltage supply B+ in the usual manner. Thus, the resistor 136 connects the plate 107 of device 102 to the plate voltage supply B+. Resistors 137 and 138 are similarly connected in the plate circuits of devices 103 and 104, respectively.

It is apparent to those skilled in the art that it is possible to modify the circuit shown in FIG. 3 so that the positive going transitions in the input signal can be used instead of the negative going transitions. Thus, the various diodes would be reversed in polarity, the negative bias voltage applied to resistor 38 would be made positive and a different type of ring counter used to provide positive gating pulses or use two inverting amplifiers between the ring counter and the gating circuits.

Many modifications may be made in this invention without departing from the spirit of the invention as exemplified in the above described embodiment and described in the appended claims.

I claim:

1. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing gating signals occurring in sequence at a plurality of output terminals with the signal at each output terminal occurring at a rate equal to the frequency of the phase shift keyed signal; and means coupling each of said gating circuits to a different one of said output terminals to apply the signals appearing thereat as said second input signal.

2. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing a signal having a frequency that is a multiple of the phase shift keyed signal; means responsive to the signal of said last-mentioned means providing gating signals occurring in sequence at a plurality of output terminals with the signal at each output terminal occurring at a rate equal to the frequency of the phase shift keyed signal; means coupling each of said gating circuits to a different one of said output terminals to apply the signals appearing thereat as said second input signal; and means coupled to two of said gating circuits to provide an output signal of one magnitude in response to the output of one of said two gating circuits and an output of another magnitude in response to the output of the other of said two gating circuits.

3. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof at the said first input signal; means responsive to the output of said gating circuits providing a signal having a frequency that is a multiple of the phase shift keyed signal; means responsive to the signal of said last-mentioned means providing gating signals occurring in sequence at a plurality of output terminals with the signal at each output terminal occurring at a rate equal to the frequency of the phase shift keyed signal; and means coupling each of said gating circuits to a different one of said output terminals to apply the signals appearing thereat as said second input signal.

4. In a receiver for phase shift keyed signals which are of a given frequency with portions of different predetermined phase, the combination comprising: means responsive to a phase shift keyed signal providing an output pulse for each transition from a given polarity to an opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing a series of equally spaced signals having a repetition rate equal to the frequency of the phase shift keyed signal; an oscillator synchronized by said last-mentioned signals; means responsive to the output of said oscillator providing gating signals occurring in sequence at a plurality of output terminals with the signal at each output terminal occurring at a rate equal to the frequency of the phase shift keyed signal; and means coupling each of said gating circuits to a different one of said output terminals to apply the signals appearing thereat as said second input signal.

5. In a receiver for phase shift keyed signals which are of a given frequency with portions of different predetermined phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing a series of equally spaced signals having a repetition rate equal to the frequency of the phase shift keyed signal; a first oscillator tuned to the frequency of the phase shift keyed signal and synchronized by said equally spaced signals; a second oscillator driven by said first oscillator and tuned to a frequency which is a multiple of the frequency of said first oscillator; a gating generator responsive to said second oscillator providing gating signals occurring in sequence at a plurality of output terminals with the signal at each output terminal occurring proportional to the frequency of said second oscillator; means coupling each of said gating circuits to a different one of said output terminals to apply the signals appearing thereat as said second input signal; and means coupled to two of said gating circuits to provide an output signal of one magnitude in response to the output of one of said gating circuits and an output of another magnitude in response to the output of the other of said two gating circuits.

6. In a receiver for phase shift keyed signals which are of a given frequency with portions of $N-1$ of N different phases, where N is an integer and with the phase of any portion as measured from an arbitrary phase reference a whole multiple of an increment of phase $\phi$, where $\phi$ is the largest increment of phase that can be divided into any of the N different phases a whole number of times, the combination comprising: means responsive to a phase shift keyed signal providing an output pulse for each transition from a given polarity to the opposite polarity of the phase shift keyed signal, $N-1$ gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing gating signals occurring in sequence at $N-1$ output terminals with the signal at each said $N-1$ output terminals occurring at a rate equal to $$\frac{360}{N\phi}$$

times the frequency of the phase shift keyed signal and having a duration equal to $$\frac{\phi}{360}$$

times the period of the phase shift keyed signal; and means coupling each of said gating circuits to a different one of said output terminals to apply the signals appearing thereat as said second input signal.

7. In a receiver for phase shift keyed signals which are of a given frequency with portions of $N-1$ of N different phases, where N is an integer and with the phase of any portion as measured from an arbitrary phase reference a whole multiple of an increment of phase $\phi$, where $\phi$ is the largest increment of phase that can be divided into any of the N different phases a whole number of times, the combination comprising: means responsive to a phase shift keyed signal providing an output pulse for each transition from a given polarity to the opposite polarity of the phase shift keyed signal; $N-1$ gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing a signal having a frequency equal to $$\frac{360}{\phi}$$

times the frequency of the phase shift keyed signal; means responsive to the output signal of said last-mentioned means providing gating signals occurring in sequence at $N-1$ output terminals with the signal at each of said $N-1$ output terminals occurring at a rate equal to $$\frac{360}{N\phi}$$

times the frequency of the phase shift keyed signal and having a duration equal to $$\frac{\phi}{360}$$

times the period of the phase shift keyed signal; and means coupling each of said gating circuits to a different one of said output terminals to apply the signals appearing thereat as said second input signal.

8. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to provide an output signal; means coupling each of said gating circuits to said first-mentioned means to apply the output pulses thereof as said first input signal; means responsive to the output of said gating circuits providing a series of equally spaced signals having a repetition rate equal to the frequency of the phase shift keyed signal; means responsive to said equally spaced signals providing gating signals occurring in sequence at a plurality of output terminals with the signal at each output terminal occurring at a rate equal to the frequency of the phase shift keyed signal; and means coupling each of said gating circuits to a different one of said output terminals to apply the signals appearing thereat as said second input signal.

References Cited in the file of this patent

UNITED STATES PATENTS 2,904,683 Meyer ---------------- Sept. 15, 1959